United States Patent
Lee et al.

(10) Patent No.: US 10,275,371 B2
(45) Date of Patent: Apr. 30, 2019

(54) METHOD AND APPARATUS FOR CONTROLLING MEMORY OPERATION

(71) Applicant: Samsung Electronics Co., Ltd., Gyeonggi-do (KR)

(72) Inventors: Keongho Lee, Seoul (KR); Seungbeom Lee, Gyeonggi-do (KR); Joongbaik Kim, Seoul (KR); Seungwook Lee, Seoul (KR); Chunmok Chung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 14/316,655

(22) Filed: Jun. 26, 2014

(65) Prior Publication Data
US 2015/0006762 A1    Jan. 1, 2015

(30) Foreign Application Priority Data

Jun. 26, 2013 (KR) ........................ 10-2013-0073612

(51) Int. Cl.
*G06F 3/06* (2006.01)
*G06F 13/16* (2006.01)

(52) U.S. Cl.
CPC ................. *G06F 13/1673* (2013.01)

(58) Field of Classification Search
None
See application file for complete search history.

(56) References Cited

U.S. PATENT DOCUMENTS

| | | | |
|---|---|---|---|
| 6,452,933 B1 | 9/2002 | Duffield et al. | |
| 6,469,928 B2 | 10/2002 | Takata | |
| 6,694,424 B1 | 2/2004 | Keller et al. | |
| 6,813,677 B1 | 11/2004 | Gupta | |
| 7,492,368 B1* | 2/2009 | Nordquist | G06F 13/161 345/502 |
| 7,562,364 B2 | 7/2009 | Sanjay | |
| 8,392,633 B2 | 3/2013 | Gulati et al. | |
| 8,615,629 B2 | 12/2013 | Sukonik et al. | |
| 2001/0036105 A1 | 11/2001 | Takata | |
| 2003/0181992 A1* | 9/2003 | Lee | G05B 15/02 700/2 |

(Continued)

FOREIGN PATENT DOCUMENTS

EP    1160793 A2    12/2001

OTHER PUBLICATIONS

International Search Report dated Oct. 6, 2014 in connection with International Application No. PCT/KR2014/005716; 3 pages.

(Continued)

*Primary Examiner* — Ilwoo Park
*Assistant Examiner* — Aurangzeb Hassan

(57) ABSTRACT

A method for controlling a memory operation includes determining a number of commands for each memory address based on information of requests stored in an interface buffer and a scheduler buffer, determining a control state of the memory operation according to a command type with a largest number of commands, and determining types of a request transmitted to the scheduler buffer from the interface buffer and a request output from the scheduler buffer according to a control state of the memory operation. Other embodiments including an apparatus for controlling a memory are also disclosed.

17 Claims, 8 Drawing Sheets

(56) References Cited

U.S. PATENT DOCUMENTS

| | | | |
|---|---|---|---|
| 2003/0196057 A1* | 10/2003 | Tsukude | G11C 11/406 711/167 |
| 2005/0132127 A1* | 6/2005 | Chung | G06F 12/0246 711/103 |
| 2005/0132146 A1* | 6/2005 | Kim | G06F 13/1647 711/151 |
| 2005/0172084 A1 | 8/2005 | Jeddeloh | |
| 2006/0133157 A1* | 6/2006 | Murin | G06F 3/0626 365/189.16 |
| 2007/0016807 A1* | 1/2007 | Lim | G06F 1/3225 713/300 |
| 2007/0156946 A1 | 7/2007 | Lakshmanamurthy et al. | |
| 2010/0082910 A1* | 4/2010 | Raikar | H04L 12/40058 711/154 |
| 2010/0169519 A1 | 7/2010 | Zhang et al. | |
| 2010/0312950 A1* | 12/2010 | Hsieh | G06F 3/0616 711/103 |
| 2011/0179240 A1* | 7/2011 | Sukonik | G06F 12/08 711/158 |
| 2011/0258353 A1 | 10/2011 | Wang | |
| 2012/0278530 A1* | 11/2012 | Ebsen | G06F 3/0659 711/103 |
| 2013/0246818 A1* | 9/2013 | Nomura | G06F 1/3275 713/320 |

OTHER PUBLICATIONS

Ishii et al.; "High Performance Memory Access Scheduling Using Compute-Phase Prediction and Writeback-Refresh Overlap"; www.cs.utah.edu; 6 pages.

Moon, et al.; "The Compact Memory Scheduling Maximizing Row Buffer Locality"; www.cs.utah.edu; 6 pages.

Foreign Communication From a Related Counterpart Application, European Application No. 14817499.8-1953, Extended European Search Report dated Feb. 28, 2017, 6 pages.

* cited by examiner

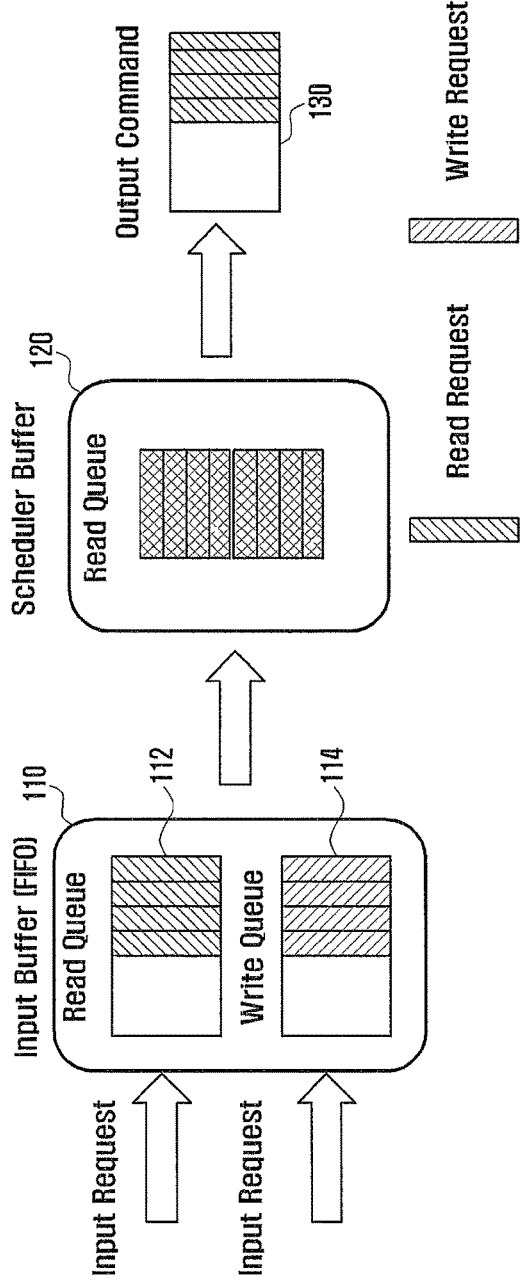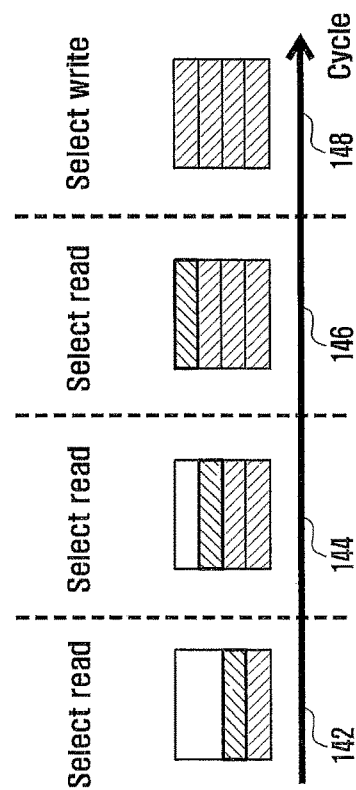
FIG. 1A
FIG. 1B

METHOD AND APPARATUS FOR CONTROLLING MEMORY OPERATION

CROSS-REFERENCE TO RELATED APPLICATION AND CLAIM OF PRIORITY

The present application is related to and claims the benefit under 35 U.S.C. § 119(a) of a Korean patent application No. 10-2013-0073612 filed in the Korean Intellectual Property Office on Jun. 26, 2013, the entire disclosure of which is hereby incorporated by reference.

TECHNICAL FIELD

The present disclosure relates generally to a method and an apparatus for controlling a memory operation, and more particularly to a method and an apparatus for controlling a memory operation by selecting a request stored in a scheduler buffer to generate a command.

BACKGROUND

In general, a Dynamic Random Access Memory (DRAM) should open a row for each bank to use due to a characteristic thereof. When a row address corresponding to a command is different from a row address being currently used, the DRAM should close the corresponding row and then reopen the row corresponding to the row address of the command to use it.

At this time, respective DRAM memories have their waiting time to perform open, close, read, and write commands for the memory row. A row locality technology has been proposed to solve the above problems and corresponds to a scheme in which a memory controller first processes a request having the same row address as that of the open row of the memory. That is, according to the row locality technology, it is possible to reduce the time to close and reopen the row by opening a particular row address and then processing a request having the same row address, thereby increasing utilization.

The memory controller can use only a scheduler buffer having a limited size due to a characteristic of a System on Chip (SoC) structure. A size of the scheduler buffer is a very important element in determining the utilization. Accordingly, in a method of increasing the utilization through the scheduler buffer having the limited size, the memory controller may receive an input of a request having high row buffer locality by the scheduler buffer to perform scheduling or may increase the limited buffer size to allow various selections. The increase in the buffer size results in larger costs.

Further, as another method of increasing the utilization, there is a method of reducing read/write switching. Specifically, there is waiting time to perform a write command after performing a read command in the memory and waiting time to perform a read command after performing a write command. Accordingly, the utilization may vary at 50% or more depending on the performance orders of the memory commands (open, close, read, and write).

Another method may increase efficiency by securing various requests for respective banks and processing the request according to each bank. Specifically, requests for respective banks are maximized by asking an interface buffer for the smallest number of requests for respective banks existing in a scheduler buffer.

SUMMARY

To address the above-discussed deficiencies, it is a primary object to provide a method and an apparatus for increasing utilization by dynamically controlling a scheduler buffer based on request information stored in the buffer.

In accordance with an aspect of the present disclosure, a method of controlling a memory operation is provided. The method includes: determining a number of commands for each memory address based on information of requests stored in an interface buffer and a scheduler buffer; determining a control state of the memory operation according to a command type with a largest number of commands; and determining types of a request transmitted to the scheduler buffer from the interface buffer and a request output from the scheduler buffer according to a control state of the memory operation.

In accordance with another aspect of the present disclosure, an apparatus for controlling a memory is provided. The apparatus includes: a state predictor for determining a number of commands for each memory address based on information of requests stored in an interface buffer and a scheduler buffer and determining a control state of the memory operation according to a command type with the largest number of commands; and a selector for determining types of a request transmitted to the scheduler buffer from the interface buffer and a request output from the scheduler buffer according to a control state of the memory operation.

Based on a method and an apparatus for controlling a memory operation according to the present disclosure, it is possible to increase utilization by adaptively controlling proportions of a read request and a write request of a scheduler buffer according to request information stored in an interface buffer and the scheduler buffer.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A and 1B illustrate an example of a buffer structure according to a memory controlling method;

DETAILED DESCRIPTION

Figure 2:
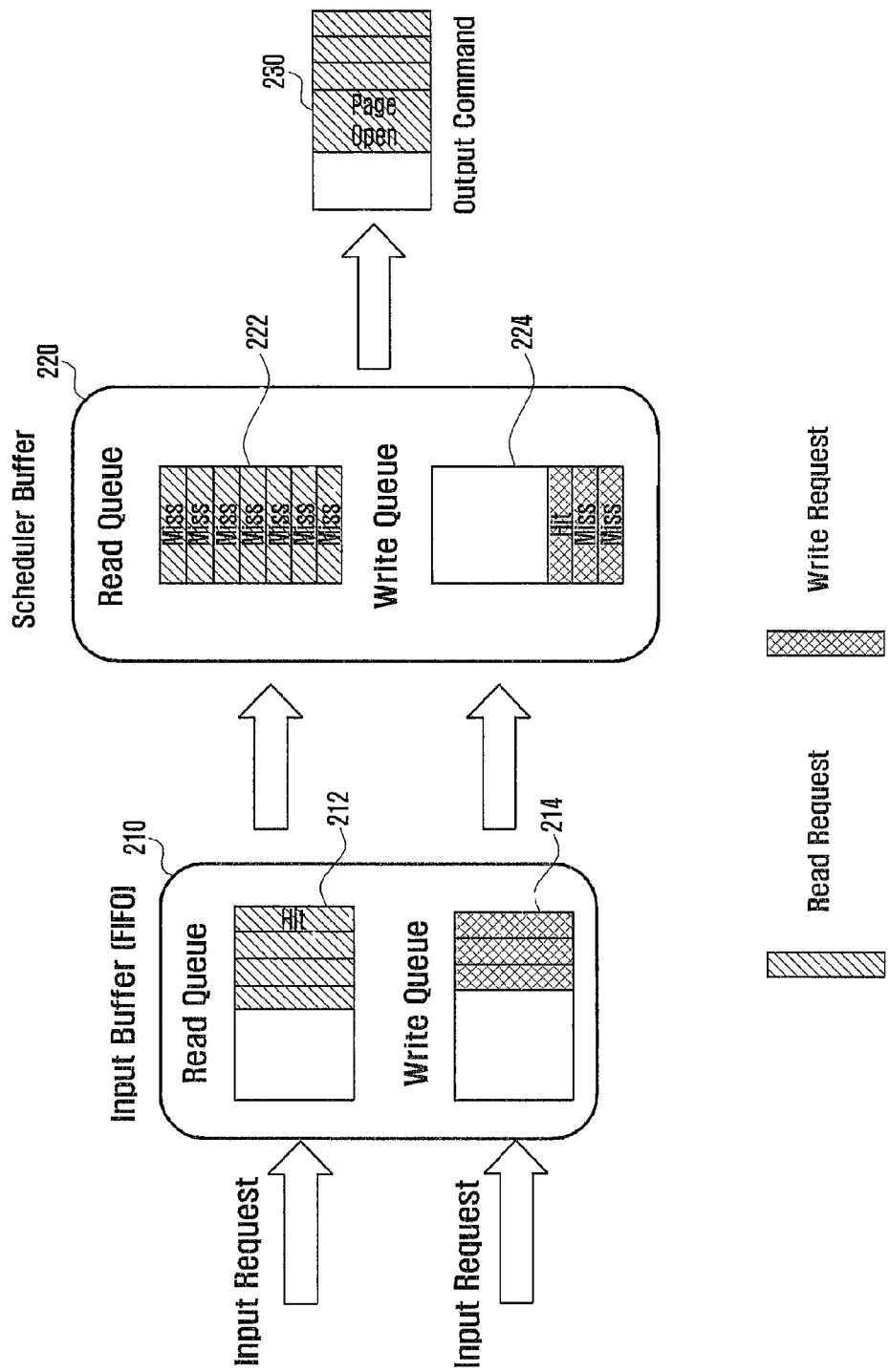
FIG. 2 illustrates an example of a buffer structure.

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged computer technologies. Hereinafter, exemplary embodiments of the present disclosure will be described with reference to the accompanying drawings. It should be noted that the same elements will be designated by the same reference numerals although they are shown in different drawings. Further, detailed descriptions related to well-known functions or configurations capable of making subject matters of the present disclosure unnecessarily obscure will be omitted.

FIGS. 1A and 1B illustrate an example buffer structure according to one memory controlling scheme. Referring to FIG. 1A, an input buffer 110 has a structure of a First In First Output (FIFO) type including a read queue 112 storing read requests and a write queue 114 storing write requests which are separated from each other, and a scheduler buffer 120 has a structure including one queue.

When the read and write requests are simultaneously input into the scheduler buffer from the input buffer 110 and the scheduler successively selects only the read request in every cycle and transmits output commands 130 to the memory as indicated by reference numerals 142, 144, and 146 of FIG. 1B, write requests which have not been selected occupy the scheduler buffer 120 as indicated by a reference number 148. Accordingly, the scheduler cannot help but select the write request even when the memory is in a read operation state, so that read/write switching is generated or row locality of the read request becomes low. As a result, the utilization of the scheduler buffer 120 may be reduced.

FIG. 2 illustrates another example of one buffer structure. Referring to FIG. 2, an input buffer 210 has a structure of a First In First Output (FIFO) type including a read queue 212 storing a read request and a write queue 214 storing a write request which are separated from each other, and a scheduler buffer 220 includes a read queue 222 and a write queue 224 which have fixed sizes.

Since the scheduler buffer has a fixed size for read and write requests in the structure illustrated in FIG. 2, the scheduler cannot load a row hit read request from the input buffer 210, even though the write queue 224 is empty, if the read queue 222 is full, so that the scheduler should close the current open memory row and then reopen the memory row as indicated by a reference numeral 230, which causes an inefficient operation.

Figure 3:
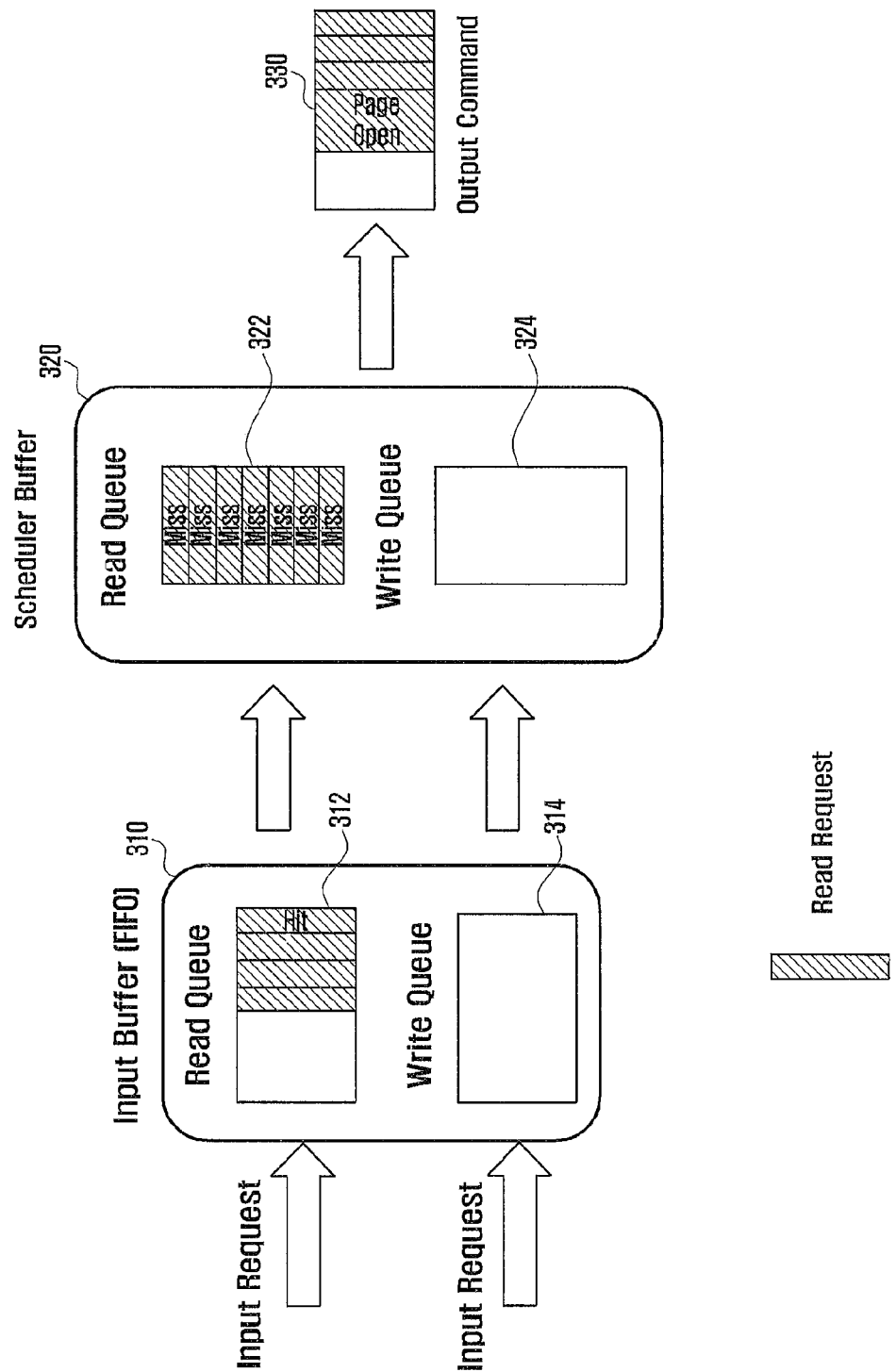
FIG. 3 illustrates another example of a buffer structure.

FIG. 3 illustrates another example buffer structure. Referring to FIG. 3, similar to FIG. 2, an input buffer 310 has a structure of a First In First Output (FIFO) type including a read queue 312 storing a read request and a write queue 314 storing a write request which are separated from each other, and a scheduler buffer 320 includes a read queue 322 and a write queue 324 which have fixed sizes.

When the memory operates in a read only mode in the structure illustrated in FIG. 3, the write queue 324 is not used at all, so that the scheduler buffer use is reduced and thus it can be difficult to increase the row locality. Further, the problem occurs in that the row is closed and then reopened as indicated by a reference numeral 330 since the row hit read request cannot be processed like in FIG. 2.

Figure 4A:
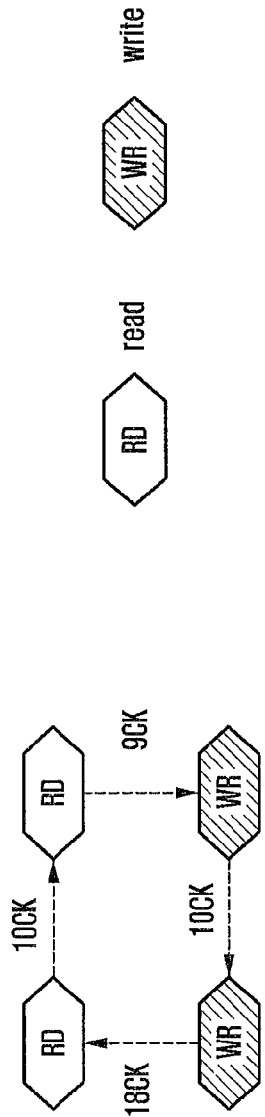
FIGS. 4A to 4C illustrate a controlling scheme for switching read/write memory.
Figure 4B:
Figure 4C:

FIGS. 4A to 4C illustrate a controlling scheme for switching read/write memory.

Referring first to FIG. 4A, it can be noted that it takes a lot of time to switch the memory from a write operation to a read operation. A case where three read operations and three write operations are performed will be described as an example. When, after the read operation, the read/write switching is generated and then the write/read switching is generated as illustrated in FIG. 4B, a total of 57 clocks (CKs) are spent. When requested read operations are all performed and then write operations are performed through the read/write switching, a total of 49 clocks (CKs) are spent, thereby reducing a total of the time required.

The present disclosure has been made to solve a structural problem and a scheduling efficiency problem of the conventional scheduler buffer described above and has a configuration of adaptively controlling the number of read and write requests stored in the scheduler buffer according to a current memory operation state and the existence or nonexistence of state switching.

Figure 5:
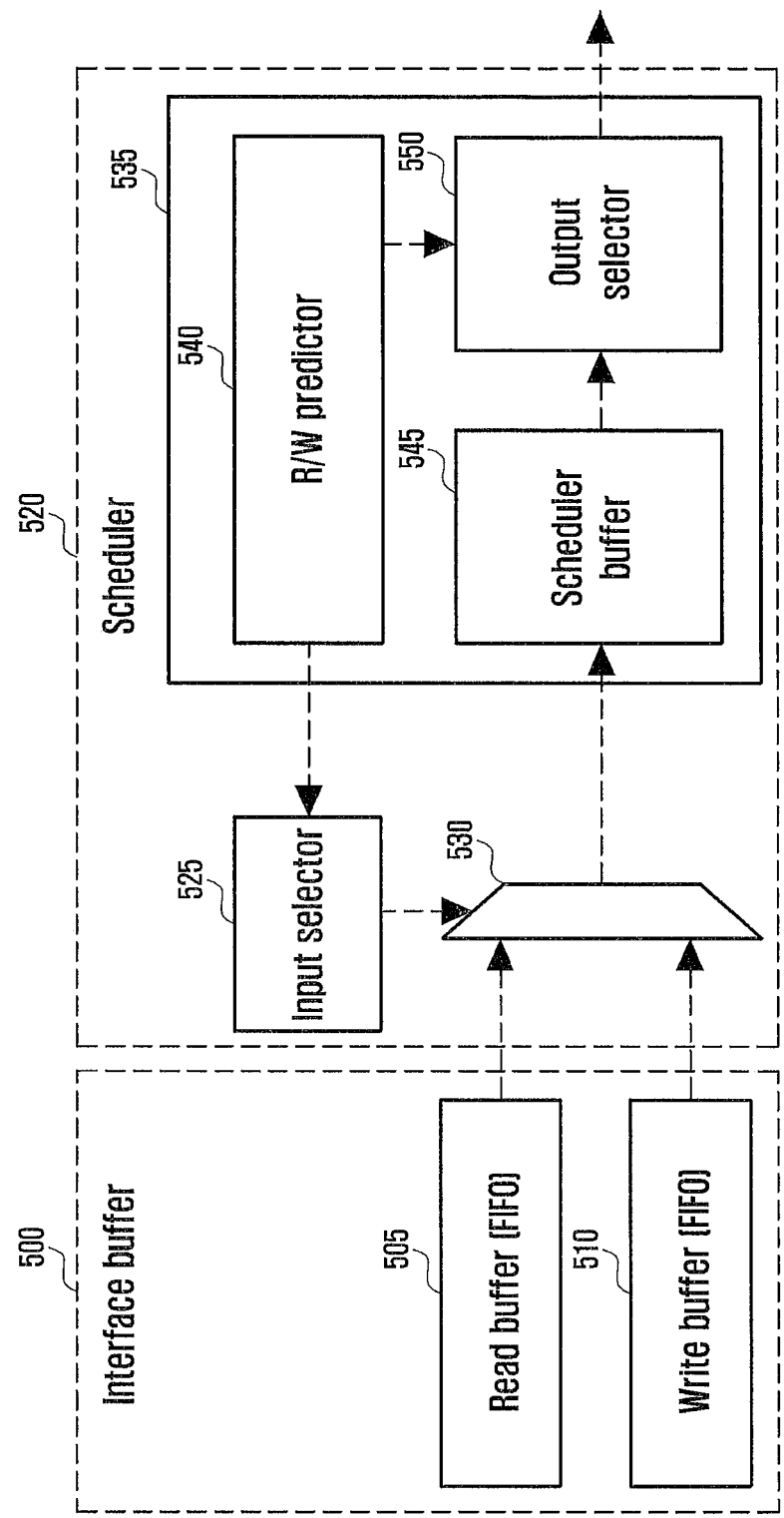
FIG. 5 illustrates a configuration of a system including a memory controller according to an embodiment of the present disclosure.

FIG. 5 illustrates a configuration of a system including a memory controller according to an embodiment of the present disclosure.

Referring to FIG. 5, a memory controller 535 according to an embodiment of the present disclosure can be implemented as a part of a scheduler 520 which performs a command in a memory based on a request output from an interface buffer 500.

For example, the memory controller can include a state predictor or a Read/Write (R/W) predictor 540 for determining whether to change a memory operation state based on a request stored in the interface buffer 500 and a scheduler buffer 545 and controlling an input selector 525 and an output selector 550 according to a result of the determination. Further, the memory controller can further include the input selector 525 and the output selector 550 for selecting types of requests output from the interface buffer 500 and the scheduler buffer 545 according to a control of the R/W predictor 540.

In an embodiment of the present disclosure, the interface buffer 500 can include a read buffer 505 and a write buffer 510 corresponding to a FIFO structure and the scheduler buffer 545 can have a single queue structure.

The input selector 525 selects a buffer, which will receive a request, from the read buffer 505 and the write buffer 510 of the interface buffer 500 by controlling a multiplexer 530 which transmits the request output from the interface buffer 500 to the scheduler buffer 545. At this time, in order to secure the large number of requests for respective banks in the scheduler buffer 545, the multiplexer 530 selects the smallest number of bank requests from the requests existing in the scheduler buffer 545. Further, the output selector 550 selects the type of request output from the scheduler buffer 545 and transmits a command generated according to the selected request to the memory.

In an embodiment of the present disclosure, the R/W predictor 540 divides a state of the memory controller which corresponds to a state for controlling the memory operation into four stages. When it is determined to change the memory state, the R/W predictor 540 changes the state of the memory controller.

Figure 6:
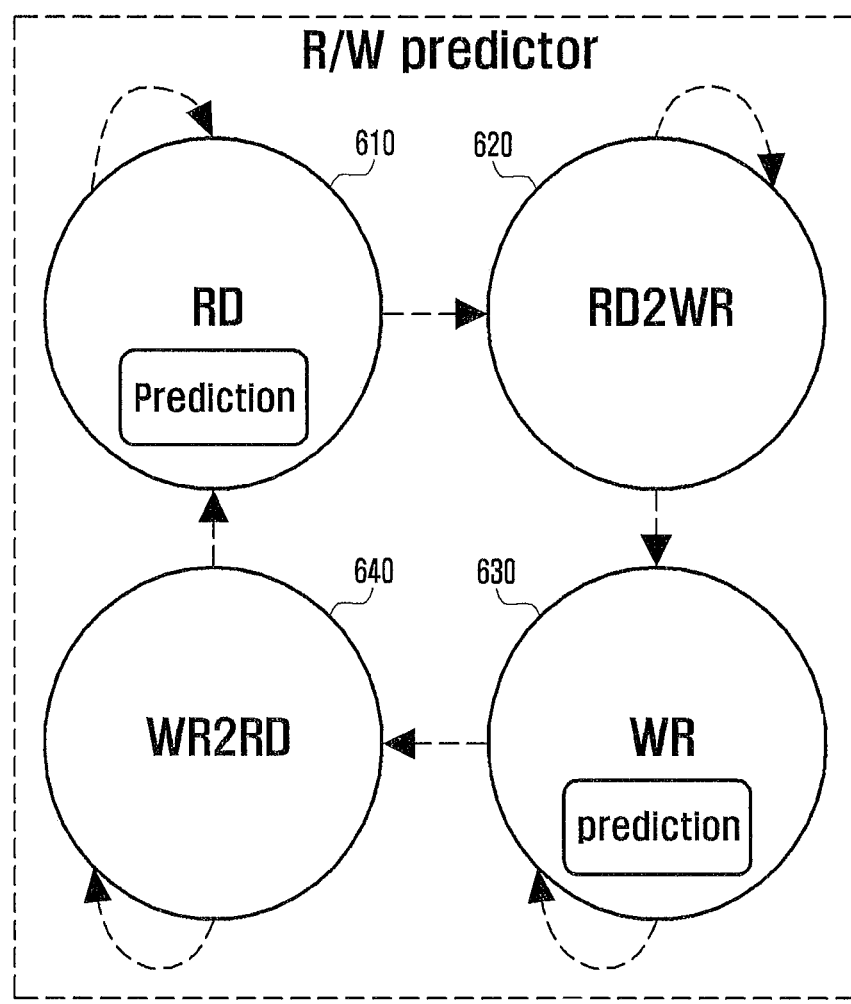
FIG. 6 illustrates a state machine indicating four states of a memory controller.

FIG. 6 illustrates a state machine indicating four states of the memory controller.

Referring to FIG. 6, the R/W predictor can divide the state of the memory controller into four states of Read (RD) 610, Read To Write (RD2WR) 620, Write (WR) 630, and Write To Read (WR2RD) 640. RD 610 and WR 630 are states corresponding to the read and write operations of the memory and RD2WR 620 is a state in which the scheduler buffer is controlled to change the memory state from a current read state to a write state. Further, WR2RD 640 is a state in which the scheduler buffer is controlled to change the memory state from a current write state to a read state. As illustrated in FIG. 6, the state of the memory controller is switched in an order of RD 610, RD2WR 620, WR 630, and WR2RD 640.

The R/W predictor analyzes requests of the interface buffer and the scheduler buffer in every cycle of the memory while the memory controller is in the RD and WR states 610 and 630. The R/W predictor determines whether to change the memory operation according to a result of the analysis, and maintains a current state of the memory controller or change the current state of the memory controller to the RD2WR state 620 or the WR2RD state 640 corresponding to the next state according to a result of the determination. As described above, since the memory controller can secure the time to control a size of the scheduler buffer in order to change the memory state through the introduction of the RD2WR state 620 and the WR2RD state 640, the utilization of the scheduler buffer can increase.

Hereinafter, a method of controlling the memory of the R/W predictor according to an embodiment of the present disclosure will be described.

Figure 7:
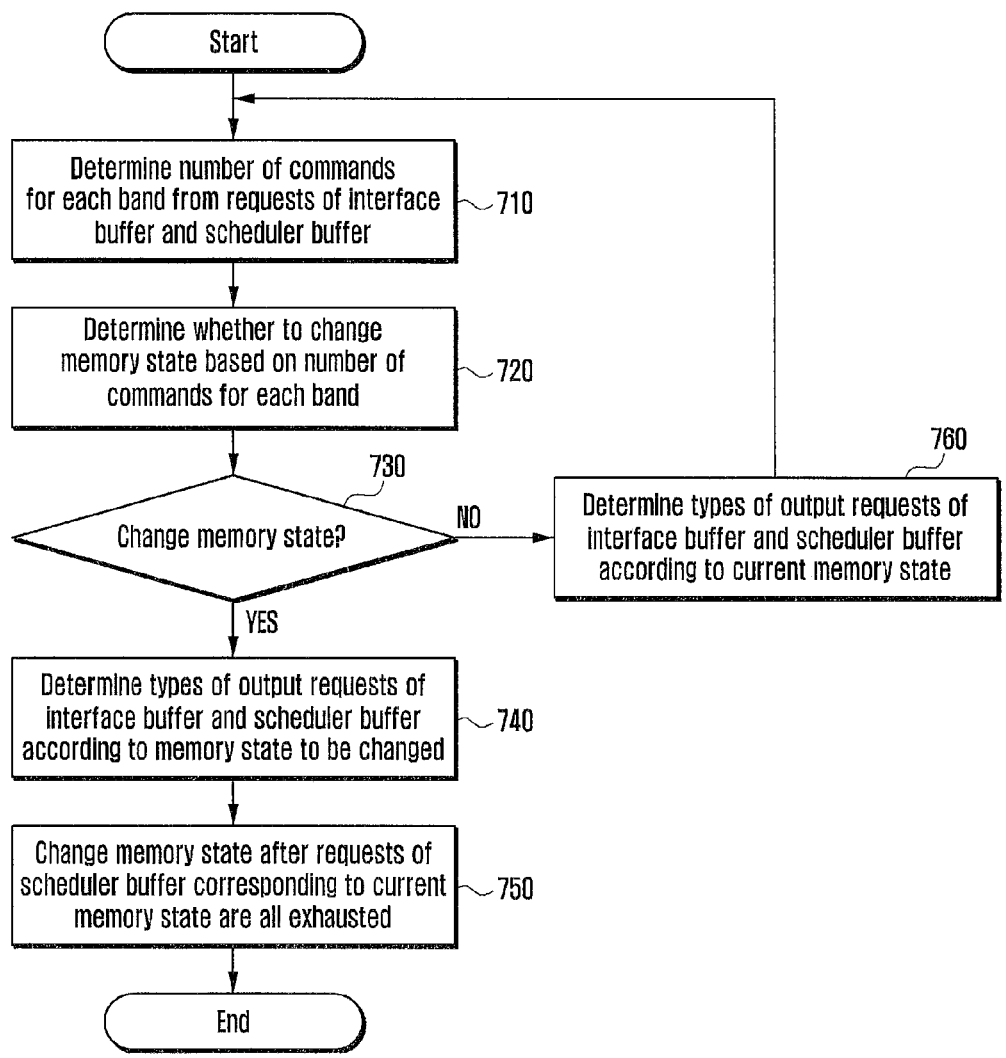
FIG. 7 is a flowchart illustrating a process of a memory controlling method according to an embodiment of the present disclosure.

FIG. 7 is a flowchart illustrating a process of the memory controlling method according to an embodiment of the present disclosure.

Referring to FIG. 7, the R/W predictor determines the number of commands for each bank of the memory from requests of the interface buffer and the scheduler buffer in step 710. At this time, the number of commands is obtained separately with respect to the read command and the write command. Further, numbers of request commands having the same row address are added up.

The determination of the number of commands can include two stages. For example, the R/W predictor determines the number of commands for each bank with respect to each of the interface buffer and the scheduler buffer in a first stage, and combines results of the determination of the interface buffer and the scheduler buffer and calculates a final result to determine the memory state in a second stage.

A case where the number of Column Address Strobe (CAS) commands for each bank of the memory is obtained as shown in Table 1 based on requests stored in the interface buffer or the scheduler buffer will be first described as an example.

TABLE 1

| Request | Address | Number of CAS commands |
| --- | --- | --- |
| 1 | Bank0, Row0 | 3 |
| 2 | Bank0, Row0 | 4 |
| 3 | Bank0, Row1 | 6 |

TABLE 1-continued

| Request | Address | Number of CAS commands |
| --- | --- | --- |
| 4 | Bank1, Row1 | 4 |
| 5 | Bank2, Row0 | 3 |
| 6 | Bank2, Row1 | 4 |

The R/W predictor sums up the numbers of CAS commands having the same address from the results shown in Table 1, aligns calculation results in a descending order, and selects only some of the higher results, so as to obtain the results as shown in Table 2 below.

TABLE 2

| Address | Number of CAS commands |
| --- | --- |
| Bank0, Row0 | 7 |
| Bank1, Row1 | 4 |
| Bank2, Row1 | 4 |

Referring to Table 2, the numbers of CAS commands of requests 1 and 2 corresponding to the same row address in Table 1 are added up.

Subsequently, the R/W predictor combines the results shown in Table 2 obtained with respect to the interface buffer and the scheduler buffer and calculates a final result of the number of commands for each bank. In this case also, the numbers of commands having the same row address are added up.

In step 720, the R/W predictor determines whether to change the memory state based on the final number of commands for each bank obtained. Whether to change the memory state is determined according to the command type with the largest number of commands. That is, when a current state of the memory does not match the command type with the largest number of commands, the R/W predictor can change the memory state. When the current state of the memory matches the command type with the largest number of commands, the R/W predictor can determine to maintain the memory state.

When the memory is currently in the write operation state and the command type with the largest number of commands is the read command, the R/W predictor can determine to change the memory state from the write state to the read state. Accordingly, the state of the memory controller is changed from the WR state 630 corresponding to the current state of the memory to the WR2RD state 640 corresponding to the next state of the memory in the state machine of FIG. 6. The memory remains in the write operation state while the memory controller is in the WR2RD state 640.

Further, when the memory is currently in the read operation state and the command type with the largest number of commands is the write command, the R/W predictor can determine to change the memory state from the read state to the write state. Accordingly, the state of the memory controller is changed from the RD state 610 corresponding to the current state of the memory to the RD2WR state 620 corresponding to the next state of the memory in the state machine of FIG. 6. The memory remains in the read operation state while the memory controller is in the RD2WR state 620.

When it is determined to change the memory state in step 730, the R/W predictor determines the type of output requests of the interface buffer and the scheduler buffer by controlling the input selector and the output selector according to the memory state to be changed in step 740.

For example, since the memory state is changed from the read state to the write state when the memory controller is in the RD2WR state, the R/W predictor performs an operation of reducing a proportion of the read requests corresponding to the current state of the memory and increasing a proportion of the write requests in the scheduler buffer. Accordingly, the input selector increases the proportion of the write requests stored in the scheduler buffer by selecting the write requests from the requests output from the interface buffer and the output selector reduces the proportion of the read requests stored in the current scheduler buffer by selecting the read requests from the requests output from the scheduler buffer under a control of the R/W predictor.

Since a case where the memory state is changed from the write state to the read state corresponds to a case where the memory controller is in the WR2RD state, the R/W predictor performs an operation of reducing a proportion of the write requests corresponding to the current state of the memory and increasing a proportion of the read requests in the scheduler buffer. Accordingly, the input selector predictor increases the proportion of the read requests stored in the scheduler buffer by selecting the read requests from the requests output from the interface buffer and the output selector reduces the proportion of the write requests stored in the current scheduler buffer by selecting the write requests from the requests output from the scheduler buffer under a control of the R/W predictor.

When the requests corresponding to the current memory state are all exhausted in the scheduler buffer through the above process, the memory state is changed, and accordingly, the state of the memory controller is also changed in step 750.

For example, when a process of increasing the proportion of the write request stored in the scheduler buffer is performed since the memory controller is in the RD2WR state and thus the number of read requests stored in the scheduler buffer is reduced to a predetermined number or smaller, the memory state is changed to perform the write operation, and accordingly, the state of the memory controller is also changed from the RD2WR state to the WR state.

Further, when the memory controller outputs the write request stored in the scheduler buffer and receives the read request from the interface buffer in the WR2RD state and thus the number of write requests stored in the scheduler buffer is reduced to a predetermined number or smaller, the memory state is changed to perform the read operation and the state of the memory controller is also changed from the WR2RD state to the RD state.

Meanwhile, when it is determined to not change the memory state in step 730, the R/W predictor determines the type of output requests of the interface buffer and the scheduler buffer by controlling the input selector and the output selector according to the current memory state in step 760.

For example, when the command type with the largest number of commands is the read command and the current memory state is the read state, the R/W predictor determines to maintain the memory state without any change. Accordingly, the state of the memory controller also remains in the RD state, and the R/W predictor selects the read request from the interface buffer by controlling the input selector and selects the read request from the scheduler buffer by controlling the output selector.

Further, when the command type with the largest number commands is the write command and the current memory state is the write state, the R/W predictor determines to maintain the memory state without any change. Accordingly, the state of the memory controller also remains in the WR state, and the R/W predictor selects the write request from the interface buffer by controlling the input selector and selects the write request from the scheduler buffer by controlling the output selector.

Figure 8:
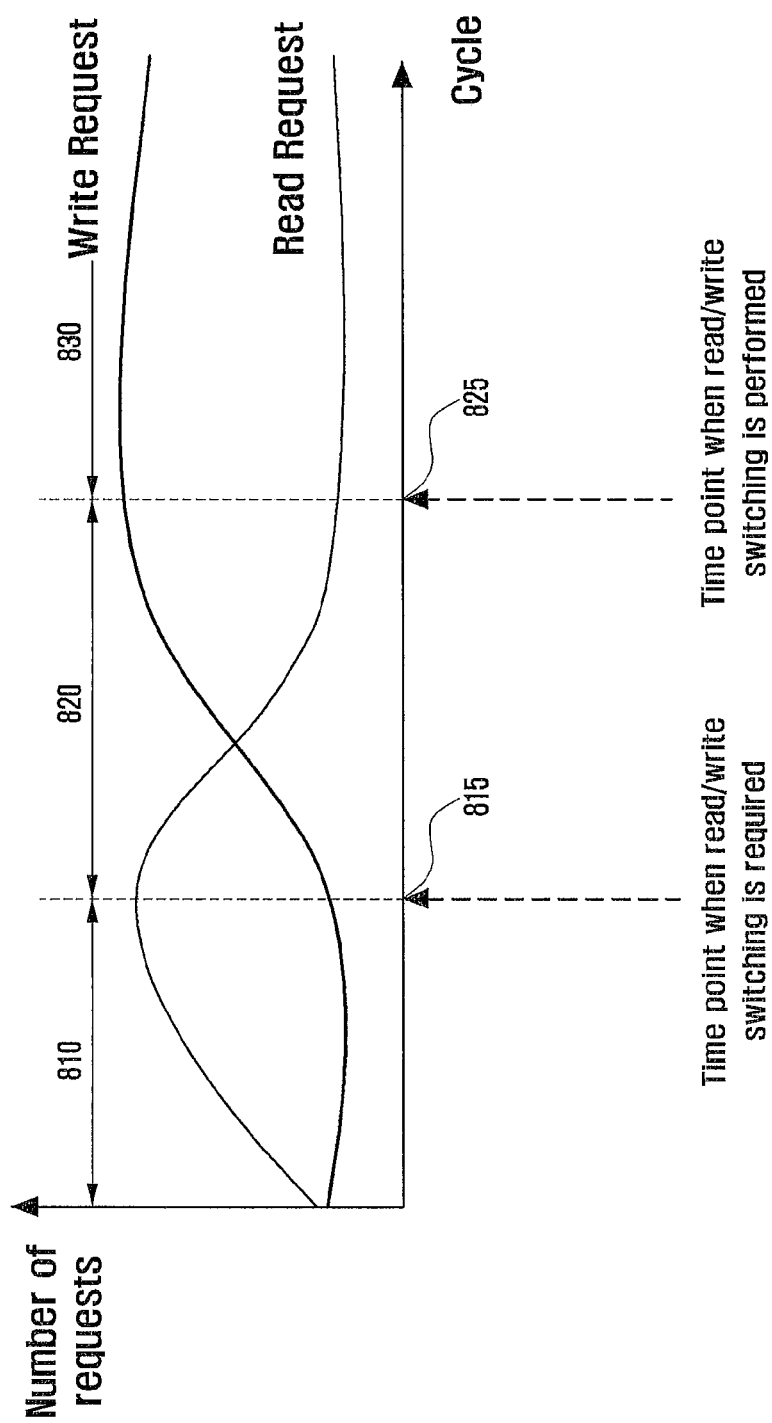
FIG. 8 illustrates an example of controlling the number of read and write requests according to an embodiment of the present disclosure.

FIG. 8 illustrates an example of controlling the number of read and write requests according to an embodiment of the present disclosure. In FIG. 8, a horizontal axis indicates the elapse of time, that is, the elapse of an operation cycle of the memory and a vertical axis indicates the number of memory requests stored in the scheduler buffer.

Referring to FIG. 8, in a first interval 810, the memory state is the read state and the state of the memory controller is also the RD state. The R/W predictor determines a current state of the memory in every cycle of the read operation of the memory during time corresponding to the first interval 810 and determines whether to change the memory state according to a result of the determination.

When it is determined to maintain the read operation corresponding to the current memory state as illustrated in the first interval 810, the R/W selects the read request from the interface buffer to receive the read request by the scheduler buffer. Accordingly, the proportion of the read request in the scheduler buffer increases.

Next, when the number of read commands of the interface buffer and the scheduler buffer reaches the maximum and the R/W predictor determines to perform the read/write switching of the memory at a time point 815, the R/W predictor changes the state of the memory controller to the RD2WR state and controls a size of the scheduler buffer such that the memory state is changed from the read state to the write state during time corresponding to a second interval 820.

Since the memory state is still the read operation state in the second interval 820, the write request is selected from the interface buffer and then input into the scheduler buffer according to a control of the R/W predictor, and the read command is performed based on the read request of the scheduler buffer in the memory. Accordingly, as illustrated in FIG. 8, according to the elapse of time, the number of read requests of the scheduler buffer is reduced and the number of write requests is increased.

When the number of write requests reaches a predetermined number, the memory state is switched from the read state to the write state at a time point 825 and the state of the memory controller is also switched from the RD2WR state to the WR state. Thereafter, since the write command is performed in the memory during a third interval 830, the proportion of the write request in the scheduler buffer increases.

As described above, in embodiments of the present disclosure, proportions of the read request and the write request of the scheduler buffer are adaptively controlled according to states of the interface buffer and the scheduler buffer, which increases the utilization.

Those skilled in the art can appreciate that it is possible to implement the present disclosure in another specific form without changing the technical idea or the indispensable characteristics of the present disclosure. Accordingly, it should be understood that the embodiments described above are merely exemplary and are not limited. The scope of the present disclosure is defined by the appended claims to be described later, rather than the detailed description. Accordingly, it should be appreciated that all modifications or variations derived from the meaning and scope of the appended claims and their equivalents are included in the range of the present disclosure.

Although the present disclosure has been described with an exemplary embodiment, various changes and be suggested to one skilled in the art. It is intended that the present disclosure encompass such changes and modifications as fall within the scope of the appended claims.

What is claimed is:

1. A method of controlling a memory operation, the method comprising:
    calculating a number of request commands for each memory address based on information of requests stored in an interface buffer and a scheduler buffer;
    determining a control state of the memory operation according to a command type with a largest number of request commands based on the calculation; and
    transmitting a type of a request to be outputted from the interface buffer and the scheduler buffer to the interface buffer and the scheduler buffer, respectively, according to the control state of the memory operation,
    wherein the control state of the memory operation includes a state for maintaining a read operation of a memory, a state for changing the read operation to a write operation of the memory, a state for maintaining the write operation, and a state for changing the write operation to the read operation.

2. The method of claim 1, further comprising
    transmitting the type of the request according to a command type with a largest number of the request commands.

3. The method of claim 2, wherein calculating the number of the request commands comprises adding up commands corresponding to the request commands having an equal row address.

4. The method of claim 1, wherein the control state of the memory operation includes a state for maintaining a current memory operation and a state for changing the memory operation.

5. The method of claim 4, wherein determining the control state of the memory operation comprises determining the control state of the memory operation as the state for maintaining the current memory operation when the command type with the largest number of the request commands matches the current memory operation, and
    wherein transmitting the type of the request comprises determining the type of the request transmitted to the scheduler buffer from the interface buffer and the type of the request output from the scheduler buffer as the type of the request corresponding to the current memory operation.

6. The method of claim 4, wherein determining the control state of the memory operation comprises determining the control state of the memory operation as the state for changing the memory operation, when the command type with the largest number of the request commands does not match the current memory operation, and
    wherein the transmitting the type of the request comprises determining the type of the request transmitted to the scheduler buffer from the interface buffer as the type of the request corresponding to a memory operation to which the current memory operation will be changed and the type of the request output from the scheduler buffer as the type of the request corresponding to the current memory operation.

7. The method of claim 5, further comprising, when the number of the request commands corresponding to the current memory operation is reduced to a preset reference value or a smaller value than the preset reference value in the scheduler buffer, changing the memory operation and the control state of the memory operation.

8. The method of claim 3, wherein the calculation of the number of request commands is performed in every cycle of the memory operation while the control state of the memory operation is in a state for maintaining a current memory operation.

9. The method of claim 4, wherein the control state of the memory operation is sequentially changed in an order of a state for maintaining the read operation of the memory, the state for changing the read operation of the memory to the write operation, the state for maintaining the write operation of the memory, and the state for changing the write operation of the memory to the read operation.

10. An apparatus for controlling a memory, the apparatus comprising:
    a state predictor configured to calculate a number of request commands for each memory address based on information of requests stored in an interface buffer and a scheduler buffer and to
    determine a control state of a memory operation according to a command type with a largest number of request commands based on a result of the calculation; and
    a selector configured to transmit a type of a request to be outputted from the interface buffer and the scheduler buffer to the interface buffer and the scheduler buffer, respectively, according to the control state of the memory operation,
    wherein the control state of the memory operation includes a state for maintaining a read operation of a memory, a state for changing the read operation to a write operation of the memory, a state for maintaining the write operation, and a state for changing the write operation to the read operation.

11. The apparatus of claim 10, wherein the state predictor is configured to
    transmit the type of the request according to a command type with a largest number of the request commands.

12. The apparatus of claim 11, wherein the control state of the memory operation includes a state for maintaining a current memory operation and a state for changing the memory operation.

13. The apparatus of claim 12, wherein the state predictor is further configured to determine the control state of the memory operation as the state for maintaining the current memory operation when the command type with the largest number of the request commands matches the current memory operation, and
    wherein the selector is further configured to determine the type of the request transmitted to the scheduler buffer from the interface buffer and the type of the request output from the scheduler buffer as the type of the request corresponding to the current memory operation.

14. The apparatus of claim 12, wherein the state predictor is configured to determine the control state of the memory operation as the state for changing the memory operation, when the command type with the largest number of the request commands does not match the current memory operation, and
    wherein the selector is configured to determine the type of the request transmitted to the scheduler buffer from the interface buffer as the type of the request corresponding to a memory operation to which the current memory operation will be changed and the type of the request output from the scheduler buffer as the type of the request corresponding to the current memory operation.

15. The apparatus of claim 14, wherein the state predictor is configured to change the memory operation and the control state of the memory operation when the number of the request commands corresponding to the current memory operation is reduced to a preset reference value or a smaller value than the preset reference value in the scheduler buffer.

16. The apparatus of claim 12, the state predictor is configured to calculate the number of request commands in every cycle of the memory operation while the control state of the memory operation is in a state for maintaining a current memory operation.

17. The apparatus of claim 12, wherein for maintaining the read operation of the memory, the control state of the memory operation is sequentially changed in an order of: the state for changing the read operation of the memory to the write operation; the state for maintaining the write operation of the memory; and the state for changing the write operation of the memory to the read operation.

\* \* \* \* \*